Patented Dec. 3, 1946

2,412,116

UNITED STATES PATENT OFFICE 2,412,116

PHENYL SULFONYL DIESTERS OF NITRO ALCOHOLS

Philip J. Baker, Jr., Terre Haute, Ind., assignor to Commercial Solvents Corporation, Terre Haute, Ind., a corporation of Maryland No Drawing. Application July 9, 1945, Serial No. 604,082

4 Claims. (Cl. 260—456)

The present invention relates to new chemical compounds and is a continuation-in-part of my copending application Serial No. 521,125, filed February 4, 1944.

More particularly the invention relates to phenyl sulfonyl esters of nitro alcohols which may be represented by the following general structural formula:

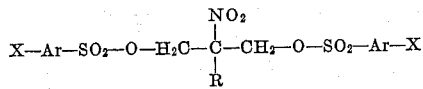

wherein R represents a substituent of the group consisting of hydrogen and alkyl, X represents a substituent selected from the group consisting of hydrogen, alkyl and acylamino, and Ar represents a phenyl nucleus.

As examples of compounds included by the above generic formula, there may be mentioned 2 - nitro-2-methyl-trimethylene p-toluenesulfonate, 2-nitro-2-methyltrimethylene benzenesulfonate, 2-nitro-2-ethyltrimethylene benzenesulfonate, 2-nitro-2-methyltrimethylene p-acetoamidobenzenesulfonate, 2-nitro-2-ethyltrimethylene p-toluenesulfonate, and the like.

In accordance with my invention, compounds of the above type are prepared by first mixing a nitro alcohol with a phenyl sulfonyl halide and thereafter slowly adding to this mixture a suitable base, such as, for example, a tertiary amine. The nitro alcohol and phenyl sulfonyl halide are preferably reacted with one another in approximately equivalent quantities while the tertiary amine is generally preferably employed in a quantity slightly in excess of the equivalent amount. The initial reaction is rather vigorous and precautions should therefore be taken in order to avoid decomposition of the reactants. After the initial stage of the reaction has been completed, however, the reaction mixture is preferably heated to a temperature of between about 80° C. and 100° C. so that the reaction is driven as nearly to completion as possible. The resultant mixture is then cooled, and water is added in order to remove the hydrogen halide of the tertiary amine and any unreacted alcohol which may be present. At this stage of the procedure, the ester will generally be observed to solidify. The product is then filtered and washed with water. In most cases the esters can be crystallized either from methanol or ethanol. Frequently benzene or similar hydrocarbons can be used for this purpose.

The nitro alcohols utilized in preparing the new phenyl sulfonyl esters of my invention may be any of a number of compounds such as, for example, 2-nitro-1,3-propanediol, 2-nitro-2-methyl-1,3-propanediol, 2-nitro-2-ethyl-1,3-propanediol, 2-nitro-2-propyl-1,3-propanediol, and the like.

As examples of tertiary amines which may be utilized in synthesizing the compounds of my invention, there may be mentioned pyridine, trimethylamine, tributylamine, quinoline, and the like. Bases such as sodium carbonate and sodium hydroxide may also be employed in place of tertiary amines; however, it has been my general observation that the results obtained when using such bases are less satisfactory. Solvents, such as benzene, chloroform, and xylene, may be employed. However, it has usually been found that the yield of the desired aryl sulfonyl ester is lower when a solvent is utilized.

My invention may be further illustrated by the example which follows. Since the reaction involved is general in character, it is considered unnecessary to set forth more than a single example of the procedure employed for preparing the phenyl sulfonyl esters of my invention.

EXAMPLE

A mixture consisting of 3.8 parts of 2-nitro-2-ethyl-1,3-propanediol and 9.5 parts of p-toluenesulfonyl chloride were placed in a reaction vessel and 4 parts of pyridine were added to the mixture. The mixture was warmed for one hour over a steam bath. It was then cooled and water was added and the mixture filtered. The product was allowed to crystallize and was then recrystallized from benzene yielding 5 parts of 2-nitro-2-ethyltrimethylene p-toluenesulfonate corresponding to a yield of 43.8%. The product had a melting point of 153 to 154° C. and a nitrogen content of 3.53% and a sulfur content of 14.42%; calculated nitrogen, 3.04%; calculated sulfur, 13.99%.

In the table which follows, there appears a list of typical compounds prepared in accordance with the procedure outlined in the example above.

Table

| Compound | M. P., °C. | Analyses ||||
|---|---|---|---|---|---|
| | | Found || Calc'd ||
| | | Per cent N | Per cent S | Per cent N | Per cent S |
| 2-nitro-2-methyltrimethylene p-toluenesulfonate | 98.5-99 | 3.61 | 14.46 | 3.15 | 14.43 |
| 2-nitro-2-ethyltrimethylene p-toluenesulfonate | 153-154 | 3.53 | 14.42 | 3.04 | 13.99 |
| 2-nitro-2-methyltrimethylene benzenesulfonate | 114 | 3.64 | 15.60 | 3.35 | 15.40 |
| 2-nitro-2-ethyltrimethylene benzenesulfonate | 69-69.5 | 3.53 | 15.50 | 3.26 | 14.90 |
| 2-nitro-2-methyltrimethylene p-acetamidobenzenesulfonate | 198 | 8.10 | 12.7 | 7.93 | 12.1 |

Although the above physical properties may be helpful in identifying these compounds, it is to be understood that I do not desire to limit myself to products having the exact physical constants described above, since the data were obtained from a single preparation of the various compounds listed.

The phenyl sulfonyl esters of my invention are useful for numerous purposes, particularly as plasticizers for synthetic rubber and similar type polymers. Other uses of these products will readily occur to those skilled in the art.

My invention now having been described, what I claim is:

1. Phenyl sulfonyl esters of nitro alcohols having the formula:

$$X-Ar-SO_2-O-H_2C-\underset{R}{\overset{NO_2}{\underset{|}{\overset{|}{C}}}}-CH_2-O-SO_2-Ar-X$$

wherein R represents a substituent of the group consisting of hydrogen and alkyl, X represents a substituent selected from the group consisting of hydrogen, alkyl and acylamino, and Ar represents a phenyl nucleus.

2. 2-nitro-2-ethyltrimethylene bis(p-toluenesulfonate).

3. 2-nitro-2-methyltrimethylene bis(benzenesulfonate).

4. 2-nitro-2-methyltrimethylene bis(p-acetamidobenzenesulfonate).

PHILIP J. BAKER, JR.